Oct. 6, 1964  W. R. KING  3,151,934
METHOD OF RECOVERING LITHIUM VALUES
Filed June 12, 1961  2 Sheets-Sheet 1

FIG. 1

SOLID LINES INDICATE NON-INTEGRATED CRYOLITE RECOVERY PROCESS AND SYNTHESIS OF CRYOLITE PROCESS AS OPERATED INDEPENDENTLY.

DOTTED LINES INDICATE HOW BOTH PROCESS ARE COMBINED INTO AN INTEGRATED CRYOLITE RECOVERY PROCESS.

THE LITHIUM RECOVERY PROCESS CAN BE USED IN CONJUNCTION WITH EITHER INTEGRATED OR NON-INTEGRATED CRYOLITE RECOVERY PROCESSES.

INVENTOR.
WILLIAM R. KING
BY James E. Cooney

FIG_3_
EFFECT OF TEMPERATURE ON THE YIELD OF LiF FROM LiOH-NaOH-NaAl(OH)$_4$ AND NaF SOLUTIONS

FIG_2_

United States Patent Office 3,151,934
Patented Oct. 6, 1964

3,151,934
METHOD OF RECOVERING LITHIUM VALUES
William R. King, Sunnyvale, Calif., assignor to Kaiser Aluminum & Chemical Corporation, Oakland, Calif., a corporation of Delaware
Filed June 12, 1961, Ser. No. 116,490
25 Claims. (Cl. 23—25)

This invention relates in general to the recovery of lithium. More particularly, the invention concerns the recovery of lithium in the form of a usable compound from spent carbonaceous linings of electrolytic reduction cells for the production of aluminum. Still more particularly, the invention relates to the recovery of lithium as LiF from spent cell linings alone or in conjunction with the recovery of cryolite values therefrom.

Numerous processes have been proposed in the past for the synthesis of cryolite, some of which are practiced commercially. One advantageous method for the synthesis of cryolite is disclosed in a co-pending application by A. C. Byrns, Serial No. 598,137, filed July 16, 1956, wherein sodium silicofluoride is reacted with sodium carbonate to produce a sodium fluoride and an easily separable silica precipitate. Aluminum-containing material, such as aluminum fluoride or sodium aluminate or a cryolitic liquor extracted from spent pot linings, is then mixed with the sodium fluoride solution, and the mixture is carbonated as necessary to produce a sodium cryolite product and a carbonate liquor which is recirculated to the silicofluoride reaction step.

Also disclosed in the aforesaid application, Serial No. 598,137, is a process for the recovery of cryolite values from spent cell linings. The recovery of cryolite values from spent carbonaceous cell linings can be effected by an alkaline extraction of the cell lining to dissolve cryolite and sodium fluoride therefrom leaving a black mud residue. The "cryolitic liquor" obtained comprises an aqueous solution of sodium aluminate and sodium fluoride. This liquor is carbonated and a cryolite product results together with carbonate liquor. The recovery of cryolite values from spent cell linings can be performed independently in a "non-integrated cryolite process" or in conjunction with the synthesis of cryolite as described in Serial No. 598,137 in an "integrated cryolite process."

Figure 1:
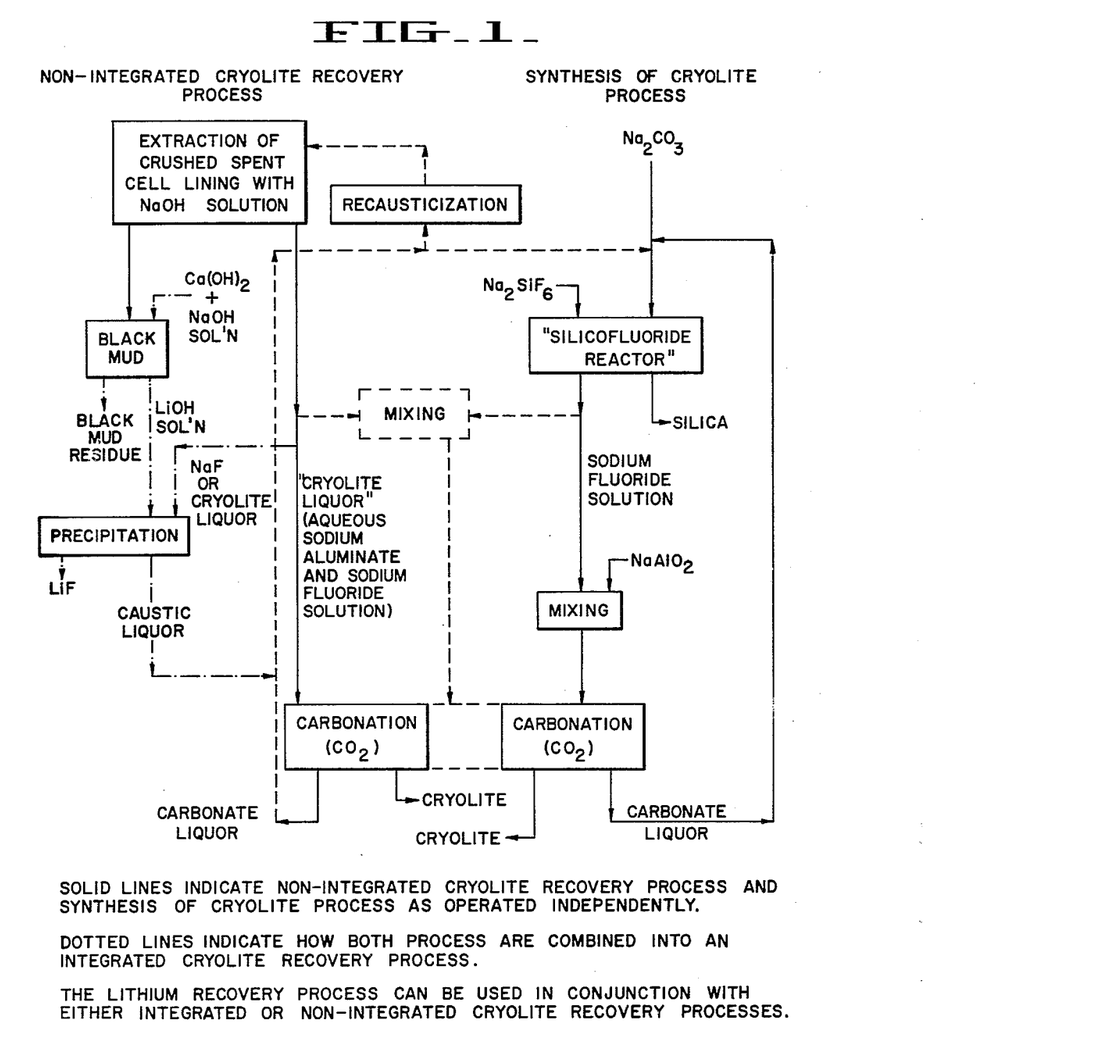

In the "integrated cryolite process" the cryolitic liquor from "pot" (electrolytic cell) lining extraction may be used as the source of aluminum, i.e., "aluminum-containing material," in the synthesis of cryolite and is accordingly mixed with the sodium fluoride solution resulting from reaction of sodium silicofluoride. The mixture is then adjusted with aluminate as needed and then carbonated and the carbonate liquor obtained is separated from the cryolite and recycled back to the sodium silicofluoride reactor. Both the "integrated" and "non-integrated" cryolite recovery processes are illustrated in flow diagrams in FIG. 1. As indicated in the flow diagrams, the recovery of lithium according to the invention may be performed alone, or in conjunction with either the "integrated" or "non-integrated" process.

In the electrolysis of alumina to produce metallic aluminum, it has been disclosed in a co-pending application to R. A. Lewis, Serial No. 724,595, filed March 28, 1958, that an electrolytic cell with a given voltage drop across it can be operated with significantly greater productive capacity and with better heat consumption through the reduction of the aluminum-containing compound, e.g., alumina, by a method wherein the alumina is dissolved in a molten electrolyte modified by the presence of or containing a predetermined amount of lithium-containing compound and wherein use is made of a substantially increased current or, in other words, where the voltage drop across the cell is maintained at least substantially equal to that existing in the cell devoid of the lithium addition of the electrolyte. The modification of the electrolyte or bath by the presence of lithium is accomplished with the addition of a suitable lithium-containing compound to the conventional molten electrolyte in the cell. The lithium is generally present in the electrolyte in an amount equal to that resulting from the addition of lithium fluoride from about 2% to 20% by weight of the molten electrolyte. The lithium source may be in the form of various compounds which are compatible with the electrolyte constituents and do not introduce excessive amounts of impurities into the cell. For example, use can be made of lithium fluoride, lithium aluminum fluoride (lithium cryolite), lithium carbonate, lithium hydroxide, or lithium aluminate. In providing the necessary lithium content in the electrolyte, these compounds can be used singly or in combination. Although various lithium-containing compounds are suitable for purposes of improving the characteristics of electrolyte, the preferred source materials are lithium fluoride, lithium cryolite, lithium carbonate, and lithium aluminate. These lithium materials used in the cells are relatively expensive and in order to fully obtain all the economic advantages associated with the use of lithium in the electrolyte bath as complete as possible utilization of the lithium material added to the electrolyte is important.

In electrolytic cell operation, the lithium material is lost in two major ways: fume evolution and lining absorption. As the lithium-containing electrolyte is used in the electrolytic cell for the production of aluminum, the lithium constituents become absorbed in the carbon lining of the cell. As lithium material is lost from the electrolyte it must be replaced at no insignificant cost. Although the amount of lithium (as Li) in spent carbon linings is only about 0.7% by weight, the cost of the equivalent of lithium compound is approximately equal to that of the cryolite in the spent lining. It is apparent, therefore, that in order to derive the full benefit obtained through use of lithium material in the fused salt electrolyte, the losses of lithium compound must be reduced. The present invention is concerned with recovering the lithium constituents from the spent cell lining in the form of a usable compound thereby reducing the cost of operation of the electrolytic cell and improving efficiency.

Spent cell or pot linings from electrolytic cells used for the production of aluminum are rather complex mixtures. The main constituents are carbon, cryolite, sodium fluoride, and alumina. Minor materials present are lithium fluoride, lithium aluminates, lithium alumino-silicate, silica, lime, calcium fluoride, iron oxides or other salts, aluminum nitride, aluminum carbide, aluminum metal, sodium carbonate, sodium hydroxide, cyanides, water and others. A number of methods have been suggested for recovery of lithium or other values from the cell pot linings such as, for example, the burning off of the carbon from the cell lining mixture to recover the cryolite and lithium values in the residue. Unfortunately, these methods do not remove all of the undesirable impurities such as $Fe_2O_3$, CaO, and $SiO_2$, from the system.

The present invention provides a method of recovering lithium as a useful lithium salt from spent carbon cell linings. According to the invention the cell linings are first extracted, i.e., treated, with an alkaline material or substance which produces a cryolite liquor and an insoluble mud residue hereinafter designated as "black mud." The bulk of the lithium remains in the black mud which results. The black mud is then treated with a mixture containing lime, e.g., lime and sodium hydroxide mixture, which allows the extraction of lithium as a hydroxide solution. The lithium hydroxide solution is then treated with a fluoridic material such as cryolitic liquor or sodium fluoride-containing material and lithium fluoride precipitates. The alkaline material, which is preferably an aqueous NaOH, removes principally the cryolite values from the spent carbonaceous cell linings leaving the impurities, except for perhaps part of the silica. The lithium is present in the black mud mainly as the fluoride but partly as various aluminates and aluminosilicates. Lithium fluoride is soluble in water at 25° C. to the extent of only 0.05 molal, while the aluminates and aluminosilicates are practically insoluble. The recovery of lithium as the fluoride is accomplished with an over-all yield of 70–75%. The equipment necessary is rather simple and the reagents employed are relatively inexpensive.

A process for the recovery of cryolite from the cell linings of conventional baths as discussed above has previously been developed. That process involves the extraction of the cryolite and sodium fluoride values from the ground cell linings with a sodium hydroxide solution. The filtered cryolitic solution is adjusted with aluminum ions ($Al^{+++}$) as needed and then treated (carbonated) with carbon dioxide which precipitates a cryolite product low in impurities. The filtered cryolite is then calcined and a product suitable for use in the reduction cell bath results. This same process has also been found to be suitable for the recovery of cryolite from the lithium fluoride modified bath linings.

It has now been found that the bulk of the lithium in the spent lining is not extracted with the cryolite and remains in the black mud residue. The method which forms the basis of this invention involves recovering the lithium values from the black mud. This Li recovery is accomplished under proper conditions by treating with a mixture containing lime, e.g., an aqueous lime solution, $Ca(OH)_2$ or $Ca(OH)_2$—NaOH mixture, to produce a lithium hydroxide-containing product. The lithium hydroxide-containing product is then reacted with a fluoridic material, e.g., sodium fluoride or cryolitic liquor from the alkaline extraction of lining, with a resulting lithium fluoride precipitate.

The lime, $Ca(OH)_2$ or $Ca(OH)_2$—NaOH material used to solubilize the lithium values may be employed as solutions, slurries, or in solid form. It is understood that where the term "mixtures" of lime or lime and sodium hydroxide are referred to herein in the specification and claims it is intended that the terms include both heterogeneous mixtures such as slurries, suspensions, etc. and homogeneous mixtures such as solutions, including aqueous lime solutions. The term "fluoridic material" as used herein in the specification and the claims is intended to refer to fluorine-containing materials which will react with the lithium hydroxide-containing solution resulting from the solubilization of lithium values from the black mud to produce a lithium fluoride product. Examples of such materials are sodium fluoride and cryolite liquor. Where the lithium recovery system is used together with the process for recovery of cryolite from cell linings, the fluoridic material used should be compatible with the cryolite recovery system.

According to the present invention there is provided a method of recovering lithium values from spent carbonaceous cell linings which may be used in conjunctions with the recovery of cryolitic values from spent carbonaceous cell linings. The method comprises crushing the cell linings to a suitable particle size and thereafter "extracting" the crushed cell lining. The "extraction" is performed by forming a slurry of crushed cell lining and an alkaline material preferably sodium hydroxide. The extraction products are a cryolitic liquor containing cryolitic values and a black mud containing lithium values. The proportions of cell lining and alkaline material are advantageously adjusted to obtain a fluoride ion ($F^-$) concentration in the resulting cryolitic liquor of about 9–15 g./kg., or more desirably, 12–15 g./kg. In one embodiment, the cryolitic liquor can be carbonated to produce cryolite and a carbonate liquor. In another embodiment a silicofluoride reactor is provided wherein sodium silicofluoride is reacted with sodium carbonate and a sodium fluoride solution is obtained which is removed and combined with cryolitic liquor, adjusted with aluminate solution if necessary, and then the mixture is carbonated. Carbonation is preferably performed with carbon dioxide which may be in the form of any gas-containing carbon dioxide, such as flue gases, exhaust gases, etc. Part of the carbonate liquor obtained jointly with the cryolite may be causticized by addition of lime and recycled to the cell lining extraction. The other portion of the carbonate liquor may be recycled to the silicofluoride reactor. Undissolved lithium values are recovered from the black mud resulting after alkaline extraction of cell lining by solubilizing same with a solution, slurry, etc. containing lime alone or a mixture of lime and caustic soda. The lithium values are removed as a lithium hydroxide-containing solution. Lithium fluoride is precipitated from the hydroxide solution by a suitable fluoride constituent, such as cryolitic liquor or other sodium fluoride-containing material. The lithium fluoride precipitation preferably is carried out in the presence of LiF seed.

As indicated above, according to the invention, the spent carbonaceous cell lining is first treated with an alkaline extractant, preferably sodium hydroxide solution. To prepare the cell linings for this treatment they are first crushed to a size preferably of 2–5 cm., the spent cell linings are then further ground in a ball mill to a size to pass an 80 mesh screen (U.S. Standard). In general, the material may be ground to any desirable size, however, the size of the particle will have some effect on the rate of treatment of the lining. If the particles are too large the rate of treatment will be comparatively slow, however, if the particles are ground very fine the cost of grinding will be higher.

The following examples will serve to further explain the method of recovering lithium in the form of a usable compound according to the invention.

A cell lining blend (designated Sample 1) was made by combining various sections of lining from a 10,000 ampere reduction cell which used a 5% LiF electrolyte bath. The 50 kg. batch of the cell lining was composited by blending the various sections of the cell lining. This blend reflects the various proportional weights of the sections as they appeared in the various parts of the cell. After milling, only 300 grams of the 50 kg. would not pass on 80 mesh screen. This small amount of material was mainly aluminum metal and was discarded. In practice, when cryolite is to be recovered from spent cell linings, the linings are crushed and wet milled. It is understood, however, that either wet or dry milling may be used.

Two more sample blends were made from spent carbon linings taken from cells in commercial aluminum production lines, where lithium-containing electrolytes had been used. These samples were prepared by grinding and sizing substantially as described above with reference to Sample 1 and are designated Samples 2 and 3. The analyses of all samples is given in Table I wherein all percents are by weight.

TABLE I

*Elemental Analyses of Lithium-Pot-Lining Blends*

| Composition | Sample 1 | Sample 2 | Sample 3 |
|---|---|---|---|
| Percent of: | | | |
| Li | .664 | 0.67 | 0.692 |
| Al | 16.9 | 16.22 | 16.03 |
| F | 10.22 | 14.08 | 13.3 |
| Na | 12.1 | 14.51 | 14.5 |
| Ca | | 0.98 | 1.0 |
| Mg | | 0.05 | 0.02 |
| Fe | | 0.76 | 0.63 |
| Si | | 0.79 | 0.90 |
| $CO_2$ | 1.87 | | |
| $SO_4$ | 0.01 | | |

The storage and extraction of dry pot linings were made in the following manner. Weighed amounts of the dry ground lining blends were placed in a glass flask. Sufficient 20 g./kg. sodium hydroxide solution was then weighed into the flask to make a 40% slurry. The flasks were allowed to stand open for 30 minutes to allow any gases forming to escape. Then the flasks were closed and placed in a water bath thermostated at 60° C. where they remained for three days. The mixtures while being stored were agitated. After storage for three days, the entire sample was quantitatively transferred to a weighed flask. The extraction period was generally two hours at temperature. In those cases where the storage step was omitted, the dry lining was weighed directly into the flask and extracted in the same manner. At the end of the extraction period a small portion of the mixture was rapidly separated by centrifuging or pressure filtration through stainless steel filtering funnels to produce a clear liquor for analysis. The major portion of the slurry was then filtered and washed. The wet black muds were dried at 110° C. and blended before analysis.

The details and results are given in Table II for the extraction of cell lining blend, Sample 1, with a 2% (by weight) NaOH solution. The ion concentration product $(Li^+)(F^-)$ was found to be nearly constant at 100° and had the average value of 1.66 g.$^2$/kg.$^2$ in the liquors. The amount of lithium extracted from the lining at constant temperature depends on the final $F^-$ ion concentration in the extract liquor. Obviously, since lithium lost to the liquor is not available for extraction from the mud, it is desirable to have the lithium concentration in the liquor as low as possible without interfering with factors affecting the recovery of cryolite. The control of the $F^-$ concentration is therefore very important. It has been found that the $F^-$ concentration should be maintained generally within the limits of 9–15 g./kg., with a preferred range of 12–15 g./kg., for optimum recovery of lithium values and minimum detriment to the cryolite recovery system. The results in Table II show that when $F^-$ concentration goes down, lithium concentration goes up. It is noted, however, that lithium recovery may be obtained though the $F^-$ concentration is varied outside these limits, but, with some sacrifice of efficiency and economy with respect to the lithium and/or cryolite recovery. The $F^-$ concentration can be varied mainly by adjusting the NaOH-cell lining slurry concentration. More cell lining can be added to increase the concentration and NaOH can be added to decrease the $F^-$ concentration. However, generally the cryolite recovery system dictates the NaOH concentration which should be used. Thus, the proportions of cell lining and sodium hydroxide solution in the slurry are adjusted to obtain a $F^-$ concentration in the cryolitic liquor of about 9–15 g./kg., and preferably 12–15 g./kg. The amount of $F^-$ extracted from the lining is relatively unaffected by the conditions used. The amount of aluminum extracted is mainly determined by the temperature. The aluminum is generally not of interest in lithium recovery as long as the temperature is maintained constant. However, on cooling the aluminum will come out of solution and carry some lithium along with it as hereinafter discussed.

TABLE II

*Extraction of Sample 1a With 2% NaOH*

| Extraction Conditions b | | Products | Analyses | | | | | | $(Li^+)(F^-)$, g.$^2$/kg.$^2$ | F/Al, wt. ratio in liquor phase | Remarks |
| --- | --- | --- | --- | --- | --- | --- | --- | --- | --- | --- | --- |
| | | | Li | | F | | Al | | | | |
| Temp., °C. | Slurry conc., percent | Phase | Conc. in phase d | Percent of input in phase | Conc. in phase d | Percent of input in phase | Conc. in phase d | Percent of input in phase | | | |
| 80 | 10.7 | Liquor | 0.196 | 25.4 | 10.1 | 84.1 | 1.73 | 8.8 | 1.96 | 5.84 | Av. of 2 extractions. |
| | | Solid c | 0.62 | 71.9 | 2.37 | 17.8 | 19.5 | 88.4 | | | |
| 100 | 8.32 | Liquor | 0.233 | 39.6 | 6.77 | 75.0 | 2.02 | 13.6 | 1.58 | 3.35 | |
| | | Solid | | | | | | | | | |
| 100 | 8.68 | Liquor | 0.229 | 37.5 | 7.26 | 77.6 | 2.09 | 13.6 | 1.66 | 3.47 | |
| | | Solid | | | | | | | | | |
| 100 | 10.7 | Liquor | 0.173 | 22.5 | 9.85 | 83.0 | 2.74 | 13.9 | 1.70 | 3.60 | Av. of 17 extractions. |
| | | Solid c | 0.712 | 80.6 | 2.52 | 18.4 | 19.4 | 87.2 | | | |
| 100 | 12.0 | Liquor | 0.155 | 17.6 | 11.0 | 81.5 | 2.87 | 12.8 | 1.71 | 3.83 | |
| | | Solid c | 0.675 | 76.2 | 2.45 | 18.0 | 19.8 | 87.9 | | | | a The linings were stored as a 40% slurry in 2% NaOH for 3 days prior to extraction.
b Two hours in each case at temperature.
c Analyses of solids vary with amount of washing (due to solubility of LiF, efficiency of removal, etc.). The analyses given are for material washed with 1–2 displacements of water, i.e., with an amount of water about equal to the weight of pot lining taken in the extraction. It is not to be expected that the percentages of the various constituents in liquor and solids should therefore add to 100%.
d Concentration is g./kg. for liquors and percent for solids.

Portions of Sample 1 cell lining composite were stored for three days at 65° C. and extracted at 100° C. for 2 hours. The slurry concentration in the extraction step was made 12% in order to raise the $F^-$ concentration in the extract liquor over that obtained in previous trials. The extraction mixtures in two of the three experiments were digested for additional periods at 55° C. to determine if the lithium content of the extract liquor was lowered by this procedure. The residues were washed with more water than ordinarily would be used on a large scale process. Ordinarily only one or two displacements would be used for washing. See, for example, footnote C, Table II. Lithium thus dissolved from the black mud has been calculated. This lithium would largely remain in the black mud in a large scale process. The results presented in Table III show that the liquor held at 55° C. is lowest in $Li^+$ content. The aluminum content of the liquor is also lowered. The ion concentration product $(Li^+)(F^-)$ has a value in the held liquors which is considerably below that obtained on studies of LiF precipitation in similar liquors indicating that the precipitation of aluminum during the holding period carries lithium fluoride with it.

TABLE III

*Extraction and Lower Temperature Digestion of Sample 1 With 2% NaOH and "Recycle" Liquor*

| Experiment No. | Storage 3 days, 65° C. | | Extraction, 2 hr./100° C. | | | Products | | | Analysis of products — Li | | |
|---|---|---|---|---|---|---|---|---|---|---|---|
| | Pot lining, g. | Percent NaOH, g. | Tot. wt. after, g. | Digestion Time, min. | Digestion Temp., °C. | Wt. of residue, g. | Wt. of liq., g. | Wash water, g. | G/kg. or percent | G. | Percent of input |
| 3-A1 | 48.00 | 72.0 | b 400.0 | 225 | 54-47 | 37.0 | 363.0 | 185 | 0.084 | 0.031 | 9.7 |
| 3-A2 | | | | | | | | | 0.720 | 0.266 | 83.5 |
| 3-A3 | | | | | | | | | (a) | 0.020 | 6.3 |
| 3-B1 | 48.00 | 72.0 | 400.0 | 75 | 55-57 | 36.5 | 363.5 | 215 | 0.093 | 0.034 | 10.7 |
| 3-B2 | | | | | | | | | 0.713 | 0.260 | 81.5 |
| 3-B3 | | | | | | | | | (a) | 0.018 | 5.6 |
| 3-C1 | 48.00 | 72.0 | 399.3 | 0 | 0 | 36.0 | 363.3 | 238 | 0.155 | 0.056 | 17.6 |
| 3-C2 | | | | | | | | | 0.675 | 0.243 | 76.2 |
| 3-C3 | | | | | | | | | (a) | 0.018 | 5.6 |
| 3-D1 | 48.00 | 72.0 | c 400 | 60 | 55 | 38.3 | 329.6 | (d) | 0.093 | 0.032 | 9.5 |
| 3-D2 | | | | | | | | (d) | 0.785 | 0.301 | 89.6 |
| 3-E1 | 48.00 | 72.0 | c 400 | 60 | 55 | 38.5 | 326.3 | (d) | 0.083 | 0.028 | 8.3 |
| 3-E2 | | | | | | | | (d) | 0.785 | 0.302 | 90.0 |

| Experiment No. | Analysis of products — F | | | Analysis of products — Al | | | Liquor properties | |
|---|---|---|---|---|---|---|---|---|
| | G./kg. or percent | G. | Percent of input | G./kg. or percent | G. | Percent of input | $(Li^+)(F^-)$, g.²/kg.² | F/Al, wt. ratio |
| 3-A1 | 10.93 | 3.97 | 80.9 | 2.192 | 0.80 | 9.9 | 0.92 | 4.99 |
| 3-A2 | 2.43 | 0.90 | 18.3 | 19.87 | 7.35 | 90.6 | | |
| 3-A3 | | | | | | | | |
| 3-B1 | 10.81 | 3.93 | 80.1 | 2.142 | 0.80 | 9.9 | 1.00 | 5.05 |
| 3-B2 | 2.50 | 0.91 | 18.6 | 19.78 | 7.22 | 89.0 | | |
| 3-B3 | | | | | | | | |
| 3-C1 | 11.00 | 4.00 | 81.5 | 2.868 | 1.04 | 12.8 | 1.71 | 3.83 |
| 3-C2 | 2.45 | 0.88 | 18.0 | 19.80 | 7.13 | 87.9 | | |
| 3-C3 | | | | | | | | |
| 3-D1 | 10.84 | 3.68 | 71.6 | 2.07 | 0.70 | 8.6 | 1.01 | 5.24 |
| 3-D2 | 3.82 | 1.46 | 28.4 | 19.44 | 7.44 | 91.6 | | |
| 3-E1 | 10.90 | 3.67 | 71.4 | 2.03 | 0.68 | 8.4 | 0.90 | 5.37 |
| 3-E2 | 3.74 | 1.44 | 28.0 | 19.83 | 7.64 | 94.1 | | | a The wash water was combined with part of the filtrate. The amount of Li+ in the wash water was calculated from the analysis of the pure filtrate and the amount of the pure filtrate in the wash.
b 48 g. pot lining and 352 g. 2% NaOH.
c The 352.7 g. of "recycle" liquor used contained 16.8 mg. of Li+ and 243 mg. of F− and was 2% in NaOH.
d No wash.

Two extractions were made on stored pot linings with about 2% NaOH liquor which contained Li+, F−, and $CO_3^=$. This liquor was made to simulate the use of a causticized spent liquor from the precipitation of cryolite and is hereinafter referred to as "recycle" liquor. Each 1.018 kg. of this liquor contains 17.75 grams. NaOH, 1.06 grams $Na_2CO_3$, 1.52 grams NaF and 0.1815 g. LiF. The extraction mixtures were held at 55° C. for one hour after the two hours period at 100° C. The results which are presented in Table III show that the concentration of Li+ in the liquor phase does not rise above that found when no lithium is present in the 2% NaOH. The use of "recycled" liquor is therefore permissible and desirable for increased economy. By using spent or recycle liquor from the cryolite recovery, which already contains lithium, to extract fresh pot lining, the additional loss of lithium is considerably minimized since the amount of lithium values lost during extraction of the cell lining with caustic depends on the lithium concentration in the caustic reactant. Thus, as is seen, the lithium loss in extraction with recycle liquor is governed primarily by the ion concentration product, $(Li^+)(F^-)$.

To show the effect of holding at lower temperatures after extraction for two hours at 100° C., extractions were performed of pot lining samples. In one case, the sample was stored in agitated glass vessels for 3 days at 60° C. as a 40% slurry in extracted liquor. Extraction of the lining blend was then made as a 9.3% slurry in recycle liquor at 100° C. for two hours. The results indicate that reduction in temperature lowers the lithium and aluminum concentration while leaving the fluorine concentration nearly unchanged.

Whether or not the alkaline-cell lining slurry is stored or unstored depends on ease of handling and the over-all cycling operation. To "store", the ground cell lining is mixed with extractant liquor as a 40% slurry and kept in a vessel for a suitable length of time, e.g., a sufficient time to convert the major portion of the aluminum to the hydrated form. The storage does not generally affect the lithium recovery directly but does affect the aluminum extractability which is important in a non-integrated cryolite recovery process. In the combination process to recover both cryolite and lithium values, it may be convenient to maintain a slurry inventory prior to the digestion step.

Tests were made on extraction of cell lining with simulated recycle caustic solution. The results which are reported in Table IV show that when the extraction is made at 100° C., and the reaction products are cooled before filtration, the lithium and aluminum concentrations in the liquid are decreased. If the extraction of cell lining is performed at lower temperatures (60–80° C.) then aluminum concentration is still lower but the lithium content is not significantly changed. Therefore, if it is desirable to have more aluminum in solution, then extraction at higher temperature is better. The results in Table IV further show therefore how the F/Al ratio can be controlled by controlling temperature.

TABLE IV

*Extraction[g] of Pot Lining With a Recycle Caustic Solution.[h] Control of F/Al Ratio by Temperature at Filtration or During Extraction*

| | Conditions after extn. (at 100° C.)[i] | Phases | | | | Analyses and balance | | | | | |
|---|---|---|---|---|---|---|---|---|---|---|---|
| | | | | | | Li | | | F | | |
| | | Slurry, g. | Filtrate,[a] g. | Wash,[b] g. | Dry (Wet) solids, g. | G./kg. or percent | G. | Percent of total in | G./kg. or percent | G. | Percent of total in |
| 4-A | Cooled to 80° C. and filtered | 445.7 | 387.6 | 39.9 | 31.5 (57.2) | 0.103 0.052 0.920 | 0.040 0.002 0.290 | 11.8 0.6 85.3 97.7 | 14.6 11.5 4.67 | 5.64 0.46 1.47 | 75.6 6.2 19.7 101.5 |
| 4-B | Cooled to 70° C. and filtered | 446.0 | 387.1 | 40.0 | 31.7 (57.9) | 0.090 0.049 0.925 | 0.035 0.002 0.293 | 10.3 0.6 86.2 97.1 | 14.3 10.1 5.32 | 5.54 0.41 1.67 | 74.3 5.5 22.4 102.2 |
| 4-C | Cooled to 60° C. and filtered | 445.7 | 381.3 | 42.1 | 31.7 (61.3) | 0.079 0.038 0.981 | 0.030 0.002 0.311 | 8.8 0.6 91.5 100.9 | 15.1 7.3 5.13 | 5.76 0.31 1.63 | 77.2 4.2 21.8 103.2 |
| 4-D | Cooled to 70° C., held for 30 min. and filtered. | 444.4 | 383.8 | 40.2 | 31.8 (60.7) | 0.062 0.044 1.014 | 0.024 0.002 0.322 | 7.1 0.6 94.7 102.4 | 14.9 12.1 5.42 | 5.72 0.49 1.72 | 76.7 6.6 23.1 106.4 |
| 4-E | Extracted and filtered at 80° C. | 446.8 | 376.4 | 45.5 | 31.4 (56.2) | 0.105 0.075 0.979 | 0.040 0.003 0.307 | 11.6 1.0 90.3 102.9 | 15.4 13.7 4.23 | 5.78 0.62 1.33 | 77.4 8.3 17.8 103.5 |
| 4-F | Extracted and filtered at 60° C. | 446.6 | 384.1 | 37.7 | 32.5 (57.1) | 0.096 0.078 0.933 | 0.037 0.003 0.303 | 10.8 0.9 89.1 100.8 | 14.8 12.4 4.28 | 5.70 0.47 1.38 | 76.2 6.3 18.6 101.1 |

| | Conditions after extn. (at 100° C.)[i] | Analyses and balance | | | | | | F/Al, wt. ratio[c] Na/F,[e] extn. ratio | Percent F extn. eff.[d] Na/F,[f] extn. ratio |
|---|---|---|---|---|---|---|---|---|---|
| | | Al | | | Na | | | | |
| | | G./kg. or percent | G. | Percent of total in | G./kg. or percent | G. | Percent of total in | | |
| 4-A | Cooled to 80° C. and filtered | 3.59 1.82 18.4 | 1.39 0.07 5.81 101.0 | 19.3 1.0 80.7 | 26.5 20.2 5.52 | 10.3 0.81 1.74 | 81.1 6.4 13.7 101.2 | 4.07 1.06 | 75.4/73.4 1.05 |
| 4-B | Cooled to 70° C. and filtered | 3.59 1.83 18.3 | 1.39 0.07 5.80 100.9 | 19.3 1.0 80.6 | 26.7 16.8 5.84 | 10.3 0.67 1.85 | 81.1 5.3 14.6 101.0 | 3.98 1.06 | 72.7/69.8 1.08 |
| 4-C | Cooled to 60° C. and filtered | 3.32 1.22 18.3 | 1.27 0.05 5.80 98.9 | 17.6 0.7 80.6 | 27.3 6.32 | 10.4 2.00 | 81.9 15.7 | 4.55 (1.02) | 74.9/70.5 1.03 |
| 4-D | Cooled to 70° C., held for 30 min. and filtered. | 3.16 1.94 18.9 | 1.21 0.08 6.00 101.3 | 16.8 1.1 83.4 | 27.6 5.12 | 10.6 1.63 | 83.5 12.8 | 4.72 (1.13) | 77.4/68.9 1.15 |
| 4-E | Extracted and filtered at 80° C. | 2.73 2.19 19.2 | 1.03 0.10 6.02 99.4 | 14.3 1.4 83.7 | 27.4 22.0 4.53 | 10.3 1.00 1.42 | 80.6 7.8 11.1 99.5 | 5.62 1.04 | 80.9/76.0 1.10 |
| 4-F | Extracted and filtered at 60° C. | 2.15 1.43 19.5 | 0.826 0.054 6.34 99.6 | 11.5 0.8 88.3 | 27.4 19.7 4.71 | 10.5 0.74 1.53 | 82.3 5.3 12.0 100.1 | 6.90 1.08 | 76.7/77.0 1.08 |

[a] Calculated from: slurry +39.0−wash−wet solids weights in grams.
[b] Washed with 39.0 g. H₂O in each case. Hang-up varies slightly.
[c] Ratio in extract liquor.
[d] (F in filtrate+F in wash−F in extractant liquor)/F in pot lining;/(F in pot lining−F in black mud)/F in pot lining.
[e] Wt. ratio extracted from lining calculated from liquor analyses.
[f] Wt. ratio extracted from lining calculated from black mud and pot lining analyses.
[g] Pot lining stored 3 days at 60° C. as 40% slurry in extractant liquor. Extraction made on 9.3% slurry for 2 hours.
[h] Extractant liquor was 16.69 g./kg. in Na, 4.80 g./kg. in F, 0.1293 g./kg. in Li, and 1.311 g./kg. in Al; 405.4 g. this solution and 41.6 g. pot lining used.
[i] In first four experiments only.

Cooling the solution after extraction causes LiF to coprecipitate with hydrated alumina which comes out of solution on cooling.

In the extraction of pot linings excess alkaline extractant, e.g., NaOH, is generally used so that no solid $Na_3AlF_6$ remains undissolved. However, some $Al(OH)_3$ or partially hydrated alumina does remain. In regard to the lithium extraction, the additional solid phase LiF seems to be the only one necessary to consider in view of the constancy of the ion concentration product $(Li^+)(F^-)$. The concentration of $Li^+$ is predictable from the fluoride concentration; however, if the extract liquor is allowed to cool then the aluminum hydroxide which precipitates carries LiF with it and this makes the system somewhat unpredictable. Also, if other solid phases such as lithium bialuminate appear, then the system is further complicated. However, maximum $Li^+$ concentrations can be generally predicted and qualitative estimates can be made by examination of the various extraction data for a given set of conditions.

After the pot linings are extracted with the caustic black mud and the 2% NaOH solution. Thus, while 78% of the lithium could be extracted from 6.96 grams of black mud residue with 1.73 grams of calcium hydroxide and 93.04 grams of 2% sodium hydroxide, only 54% can be extracted from 30 grams of mud with 7.44 grams of calcium hydroxide and 70 grams of 2% sodium hydroxide. The same proportion of mud and calcium hydroxide is present in both cases. To achieve higher recoveries of lithium at the highest slurry concentrations requires more calcium hydroxide. Higher slurry concentrations are desirable since higher lithium concentrations can be produced, however, lower slurry concentrations are useful if recycle liquor extract is used to dilute the black mud slurry. Slurry mixtures of 30 grams of black mud and 70 grams of 2% NaOH plus the $Ca(OH)_2$ necessary to achieve good extraction were found to be about as concentrated as could be conveniently handled without recycle dilution. The treatment of black mud with calcium hydroxide and 2% sodium hydroxide while ball-milling does not materially improve the extraction of lithium over that obtained by simple stirring.

TABLE V

Effects of Amount of $Ca(OH)_2$, Slurry Concentration, Order of Reagent Addition, and Ball Milling on Extraction of Lithium From Black Muds at 100° C. With 2% NaOH for 2 Hours

| | Extraction mixture | | | Phases | | Analyses of liquor | | | Li in solid residue | | Remarks |
|---|---|---|---|---|---|---|---|---|---|---|---|
| | Black mud, g. | $Ca(OH)_2$, g. | 2% NaOH, g. | Liq.[a], g. | Solid, g. | Li | F | Al | | | |
| | | | | | | G./kg. | Percent of in [b] | G./kg. | G./kg. | Percent | Percent of in [b] | |
| 5-A | 6.96 | 0.311 | 93.04 | 94.1 | 5.95 | 0.294 | 44.3 | 1.21 | 2.36 | | | |
| 5-B | 6.96 | 0.864 | 93.04 | 94.2 | 6.43 | 0.396 | 59.8 | 0.49 | 1.81 | | | |
| 5-C | 6.96 | 1.728 | 93.04 | 94.1 | 7.44 | 0.518 | 78.0 | 0.41 | 1.47 | | | |
| 5-D | 6.96 | 2.60 | 93.04 | 93.9 | 8.70 | 0.547 | 82.2 | 0.17 | 1.02 | 0.129 | 17.9 | |
| 5-E | 30.0 | 7.44 | 70.0 | 73.0 | 34.2 | 1.99 | 53.8 | 1.02 | 2.28 | 0.40 | 50.8 | |
| 5-F | 6.96 | 2.0 | 93.04 | 93.8 | 7.9 | 0.543 | 80.6 | 0.39 | 0.67 | 0.154 | 19.3 | |
| 5-G [c] | 6.96 | 2.0 | 93.04 | 94.0 | 7.7 | 0.534 | 79.4 | 0.47 | 1.24 | 0.135 | 16.5 | Ball milled. |
| 5-H [d] | 6.96 | 2.0 | 93.04 | 103.4 | 7.9 | 0.488 | 79.8 | 0.29 | 0.84 | 0.157 | 19.6 | NaOH, then $Ca(OH)_2$. |
| 5-J [e] | 6.96 | 2.0 | 93.04 | 93.3 | 7.9 | 0.575 | 84.9 | 0.36 | 1.02 | 0.157 | 19.6 | $Ca(OH)_2$, then NaOH. |
| 5-K | 14.0 | 3.5 | [f] 86.0 | 87.5 | 15.9 | 0.776 | 53.4 | 0.35 | 1.11 | 0.371 | 46.4 | No NaOH used. |

[a] Weight of liquor calculated from total slurry weight less washed dry mud residue weight.
[b] Percent of lithium contained in the black mud.
[c] Extraction carried out in Monel mill with stainless steel balls.
[d] Black mud and NaOH solution heated for 1 hour at 100° C., then $Ca(OH)_2$ added and heated for one hour more.
[e] Black mud and $Ca(OH)_2$ heated for one hour at 100° C. with 89.32 g. $H_2O$, then added 3.72 g. 50% NaOH and continued heating for one hour more.
[f] No NaOH used. Extract made with water and $Ca(OH)_2$.

solution to separate the cryolitic liquor from the black mud which contains lithium constituents, the black mud is mixed with calcium hydroxide. Aqueous 2% NaOH is then added and the mixture rapidly heated to 100° C. The NaOH may alternatively be preheated before mixing. At the end of the extraction period the mixtures are filtered to produce a clear filtrate. The residues are washed and discarded.

The data presented in Table V show that the amount of lithium which can be extracted from black mud depends on how much lime is used. The amounts of lithium extracted with a given amount of lime, e.g., calcium hydroxide, also depend on the slurry concentration of the Optimum amounts of $Ca(OH)_2$ needed in the extraction of various black muds was determined for slurries of 30 grams of mud and 70 grams NaOH solution. The effect of time at the optimum calcium hydroxide usage was also measured. Variation of the strength of the sodium hydroxide solution was studied as to its effect on the extraction of the lithium. These results are tabulated in Table VI. Maximum yields of lithium from the particular black muds used of about 75% occur when about 0.30–0.37 gram $Ca(OH)_2$ per gram of black mud (9–11 grams of $Ca(OH)_2$/30 grams black mud) are used. The attainment of the maximum yield is signaled by a sudden drop in the aluminum concentration in the extract liquor.

TABLE VI

*Extraction[b] of Lithium From Black Muds at 100° C. With $Ca(OH)_2$ and NaOH Solution Effects of Time, NaOH Concentration, Amount of $Ca(OH)_2$, and Different Muds*

| Black Mud | Percent NaOH | Time, hr. | $Ca(OH)_2$, g. | g. $Ca(OH)_2$ / g. Black Mud | Phases Solid, g. | Phases Liq., g. | Li G./kg. | Li Mg. | Li Per-cent[a] | F G./kg. | Al G./kg. | Fe G./kg. | Ca G./kg. |
|---|---|---|---|---|---|---|---|---|---|---|---|---|---|
| Sample A | 2.0 | 2.0 | 4.96 | 0.165 | 33.0 | 71.6 | 2.06 | 148 | 51 | 0.64 | 1.46 | 0.038 | 0.075 |
|  | 0.2 | 2.0 | 4.96 |  | 33.1 | 70.5 | 2.00 | 141 | 59 | 0.25 | 1.24 | 0.025 | 0.113 |
|  | 2.0 | 2.0 | 6.50 | 0.217 | 34.1 | 72.0 | 2.56 | 184 | 64 | 0.64 | 1.36 | 0.023 | 0.027 |
|  | 2.0 | 2.0 | 7.44 | 0.248 | 34.8 | 72.3 | 2.84 | 205 | 72 | 0.76 | 1.27 |  |  |
|  | 2.0 | 2.0 | 9.00 | 0.300 | 36.7 | 72.0 | 3.01 | 217 | 76 | 0.30 | 0.192 |  |  |
|  | 2.0 | 2.0 | 12.0 | 0.400 | 39.8 | 72.0 | 2.88 | 207 | 72 | 0.29 | 0.07 | 0.053 | 0.021 |
|  | 2.0 | 2.0 | 7.44 | 0.248 | 34.1 | 73.3 | 1.86 | 136 | 50 | 1.01 | 2.17 |  |  |
|  | 2.0 | 2.0 | 8.62 | 0.287 | 35.0 | 73.4 | 2.29 | 168 | 62 | 0.98 | 2.27 | 0.053 | 0.15 |
|  | 2.0 | 2.0 | 10.34 | 0.345 | 36.8 | 72.8 | 2.80 | 204 | 75 | 0.69 | 1.63 | 0.057 | 0.13 |
| Sample B | 2.0 | 2.0 | 12.0 | 0.400 | c 39.0 | 73.0 | 2.72 | 199 | 73 | 0.36 | 0.17 | 0.062 | 0.022 |
|  | 2.0 | 4.0 | 8.62 |  | 35.3 | 72.4 | 2.25 | 163 | 60 | 0.88 | 1.86 | 0.052 | 0.18 |
|  | 0 | 2.0 | 7.44 |  | 34.4 | 72.8 | 1.68 | 123 | 45 | 0.73 | 1.45 |  |  |
|  | 0.2 | 2.0 | 8.62 |  | 35.5 | 73.0 | 2.15 | 157 | 58 | 0.76 | 1.76 | 0.054 | 0.17 |
|  | 0.2 | 2.0 | 10.34 |  | 36.9 | 73.0 | 2.71 | 198 | 73 | 0.61 | 1.50 | 0.051 | 0.066 |
|  | 0.2 | 4.0 | 8.62 |  | 35.6 | 72.8 | 2.13 | 155 | 57 | 0.79 | 1.43 | 0.047 | 0.030 |
|  | 2.0 | 2.0 | 5.0 | 0.167 | 32.4 | 72.0 | 1.27 | 91 | 34 | 0.76 | 1.98 | 0.058 | 0.063 |
|  | 2.0 | 2.0 | 7.0 | 0.233 | 34.0 | 72.7 | 2.06 | 150 | 56 | 0.83 | 1.66 | 0.052 | 0.036 |
|  | 2.0 | 2.0 | 9.0 | 0.300 | 35.5 | 73.1 | 2.42 | 177 | 66 | 0.75 | 1.79 | 0.038 | 0.065 |
|  | 2.0 | 2.0 | 11.0 | 0.367 | 38.0 | 72.8 | 2.97 | 216 | 81 | 0.31 | 0.14 | 0.061 | 0.038 |
|  | 2.0 | 2.0 | 12.0 | 0.400 | 38.9 | 73.1 | 2.75 | 201 | 75 | 0.32 | 0.19 |  |  |
| Sample C | 2.0 | 0.25 | 11.0 |  | d 37.9 | 72.1 | 2.84 | 205 | 77 | 0.25 | 0.17 | 0.09 | 0.055 |
|  | 2.0 | 0.50 | 11.0 |  | 38.0 | 73.3 | 2.81 | 206 | 77 | 0.25 | 0.07 | 0.06 | 0.053 |
|  | 2.0 | 1.0 | 11.0 |  | e 39.9 | 73.1 | 2.89 | 211 | 79 | 0.29 | 0.27 | 0.08 | 0.082 |
|  | 2.0 | 1.5 | 11.0 |  | 38.0 | 73.0 | 2.81 | 205 | 77 | 0.27 | 0.27 | 0.06 | 0.057 |
|  | 2.0 | 2.0 | 11.0 | 0.367 | 38.0 | 71.0 | 2.95 | 210 | 79 | 0.30 | 0.30 | 0.07 | 0.066 |
|  | 2.0 | 4.0 | 11.0 |  | 37.7 | 71.6 | 2.81 | 201 | 75 | 0.40 | 0.65 | 0.08 | 0.079 |

[a] Percent Li extracted from black mud.
[b] In each case 30.0 g. black mud and 70.0 g. solution were used.
c d e These solids contained 0.79, 0.89, and 0.95% Na, respectively.

The amount of lime used together with NaOH to dissolve the lithium values from the black mud is very important. The $Ca(OH)_2$ should be in excess of the amount required for the reaction:

$$2LiF + Ca(OH)_2 \rightarrow 2LiOH + CaF_2$$

Figure 2:
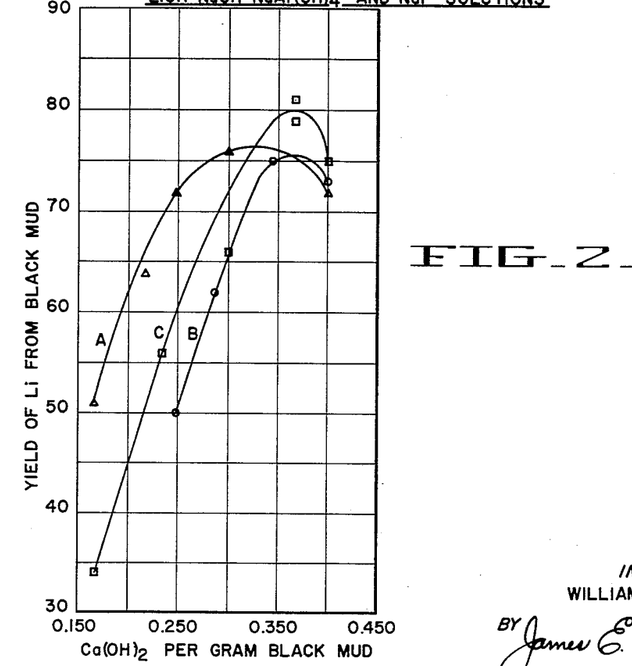

The lime must be greater than stoichiometric requirements because of the presence of reactable aluminous material such as hydrated alumina. The LiOH would react with the reactable aluminous material, e.g., hydrated alumina to produce an insoluble complex lithium compound which would not permit recovery of lithium. The formation of the lithium complex caused by reaction with hydrated alumina is avoided by introducing excess lime. The lime reacts with the reactable alumina so that none remains to tie up the lithium. It is important, therefore, that enough lime be present to react with both the "reactable" (including hydrated) alumina as well as the lithium fluoride. FIGURE 2 shows the effect on Li recovery wherein the yield of lithium from the black mud is plotted against concentration of lime in the lime-sodium hydroxide reactant for samples A, B and C from the data in Table VI with 2% NaOH at 2 hours. As can be seen, the maximum yield of lithium occurs when the lime concentration for these particular black muds used is about 0.30–0.37 gram $Ca(OH)_2$/gram of black mud. The optimum amount of lime is the point where the aluminum concentration level in the extract liquor just decreases. This decrease in the aluminum concentration level in the extract liquir occurs when all the reactable aluminous material, i.e., all the aluminous material capable of reacting under the conditions present in the lime-sodium hydroxide dissolution of black mud, is consumed. The amount of reactable aluminous material will, of course, vary among spent cell linings. Although the amount of lime required will depend on the amount of reactable aluminous material in the black mud, this amount can be easily determined with sufficient accuracy by one skilled in the art. Once the level of reactable aluminous material is determined the corresponding lime requirements can be readily established for a given system. As an illustration the amount of reactable aluminous material can be determined as follows: React a black mud sample with a sodium hydroxide or caustic solution in a quantity more than sufficient to dissolve all the reactable aluminous material. Filter off the residual and determine the aluminum content (the amount of aluminous material that did not dissolve). React another sample of black mud with caustic in the proportion which would be used in the actual operation and determine the amount of unreacted aluminous material remaining in the black mud sample. Subtract the first obtained amount of unreacted aluminum from the second. The difference is the amount of aluminous material for which the corresponding lime requirement can be empirically determined. The lime necessary to react with the resulting quantity of aluminum can be calculated according to the following equation:

$$3Ca(OH)_2 + 2Al(OH)_3 \rightarrow 3CaO \cdot Al_2O_3 \cdot 6H_2O$$

In addition, to this quantity of lime is added an amount necessary to react with the reactable fluorinous material, i.e., fluorine-containing material capable of reacting under the conditions present during dissolution of the black mud. The fluorinous material in the black mud can be analytically determined. The sum of these lime requirements is the amount to be added to solubilize the lithium values. Thus, the amount of lime must be more than sufficient to react with substantially all the reactable fluorinous and aluminous material, or, at least sufficient therefor if lime and caustic solution is used to solubilize the lithium values from the black mud.

It is noted, however, that the function of the lime, i.e., $Ca(OH)_2$ is twofold: (1) to react with the aluminum values, and (2) to tie up the fluorine as an insoluble salt ($CaF_2$). Where all aluminum values are removed in the cell lining extraction step, then it is possible to employ any material which will solubilize the lithium value and also serve to tie up the fluorine. Moreover, the two functions can be performed by different materials. For example, the fluorine may be tied up by one material and the hydroxide formed by another base material.

Similarly, if aluminum values are present but in small quantities, the optimum amount of lime will be correspondingly low, as for example, on the order of 0.10 gram Ca(OH)₂ per gram of black mud.

The solutions produced contain about 2.8 grams of lithium per kg. and 0.2 gram of Al/kg. Where recycle dilutions are used higher concentrations can be obtained such as on the order of 5 or 6 grams/kg. or higher. The use of 2% NaOH gives higher yields than 0.2% NaOH solution. A reaction time of 15 minutes is sufficient. Yield as a function of extraction time is essentially constant from 15 minutes to two hours. At four hours there is a slight decrease in yield.

Most lithium extraction studies were made using dry black mud from pot lining extractions and hydrated lime. Studies were made on the differences in lithium extractability and filterability of black mud residue using wet black mud and unslaked lime. There is no large difference in either the lithium extractability from wet or dry mud or the filtration rates of the black mud residues obtained from using either wet or dry mud for extraction. The filtration rate of black mud from pot lining extraction when put on the same basis (34% solids and 100° C.) filters at a rate comparable to that of the residue resulting from the lime-caustic treatment.

When unslaked lime (reagent grade CaO) is added to the reaction mixture instead of slaked lime (reagent grade Ca(OH)₂) the percent lithium extracted is less for 15 and 60 minute reaction times. Although unslaked lime is useful, the use of slaked lime is preferred to unslaked lime. However, in either case it is the activity of the lime which determines its usefulness. The viscosity measurements on the slurries prepared from wet and dry black muds with calcium hydroxide and 2% sodium hydroxide solution indicate no marked difference due to the initial conditions of the black mud.

It is also noted that lime alone in sufficient quantities, without NaOH, can be used to solubilize the lithium values out of the black mud. The results generally are better, however, when some aqueous NaOH solution is used with the lime.

To determine optimum washing techniques, the black mud residue was washed using a hot 2% NaOH solution. The first two washes removed only a total of 80% of the soluble lithium left in the cake. Subsequent washes were not proportionately as effective as the first two washes. Eight consecutive washes removed only approximately 93% of the total soluble lithium left in the wet cake after the initial filtration. Since simple washing of the Ca(OH)₂—NaOH solution-treated black mud was not effective enough in removing lithium values, in order to obtain closer to 100% removal during washing, it has been found preferable to reslurry the filter cake with sodium hydroxide or caustic solution. Caustic soda is preferred to a mere water wash because it suppresses the solubility of the calcium hydroxide thereby minimizing product contamination.

Two black muds prepared from lining by extraction with a "recycle" solution (simulated recycle solution) were treated with calcium hydroxide and 2% sodium hydroxide. The mixtures were filtered and washed with two displacements of 2% sodium hydroxide. The filtrate and washes were combined. The wet residue was then reslurried with 2% sodium hydroxide in an amount equal to the original liquor used in the extraction with calcium hydroxide. This mixture was then filtered. Lithium recoveries from the black mud were 79.9% and 79.1% and lithium recoveries from the pot lining of 77.9% and 77.5%.

Extraction of black mud with lime or lime and caustic soda under optimum conditions produces LiOH—NaOH solutions in an essentially pure form, i.e., with little NaAl(OH)₄ present. The precipitation of LiF from such solutions may be accomplished with various fluoridic materials reactable with LiOH to produce LiF. Examples of such fluoridic materials are NaF solutions of various types. One such solution is the cryolitic liquor derived from the alkaline extraction of the pot linings, another is NaF solution such as that available from a synthetic cryolite plant, produced from Na₂SiF₆ and sodium carbonate spent liquor. A 0.4 molar lithium solution, i.e., 2.8 grams lithium per kg., is about the maximum concentration which can be produced without recycle dilution by extraction of the black mud at a practical slurry concentration. Solutions of NaF or cryolite and sodium hydroxide can be made at a fluoride ion concentration up to a practical maximum of 15 g./kg. from Na₂SiF₆ or caustic extraction of pot lining respectively.

The optimum ratio where lithium (in terms of weight) in the spent liquor is to be minimized of weight of NaF solution to LiOH solution for maximum yield of LiF precipitate is given by the relation:

$$R = \frac{\frac{2(Li^+)_i}{(F^-)_i} + 1 - \frac{4K}{(F^-)_i^2}}{1 + \frac{4K}{(F^-)_i^2}}$$

where R is the optimum weight ratio of NaF to LiOH solution, $(L^+)_i$ is the concentration of lithium in its solution before mixing, $(F^-)_i$ is the concentration of fluoride ion in its solution before mixing and K is the solubility product constant for LiF. The units for $(Li^+)_i$ and $(F^-)_i$ are mols/kg.; for K the unit is mols²/kg.². For $(Li^+)_i = 0.4$ and $(F^-)_i = 0.789$ (i.e., 15 grams F/kg.), the value of R is about 2. Since K is small compared to the other numbers the effect of temperature on the value of R is small.

Figure 3:
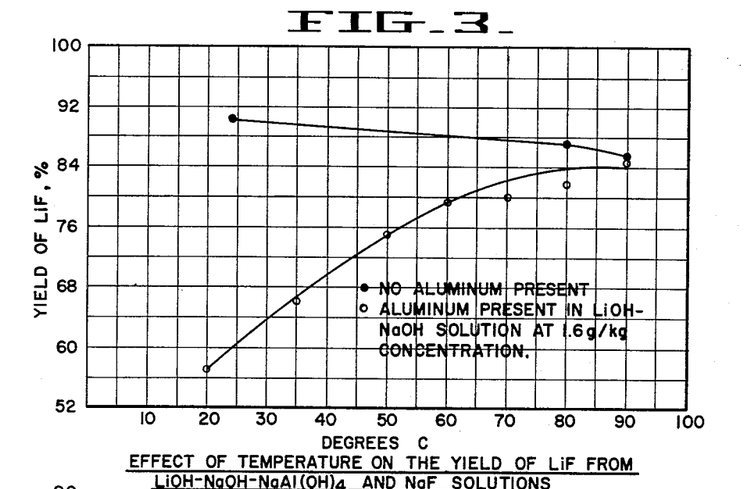

The results of some experiments where LiOH—NaOH solution, 0.4 molar in lithium and 2% in NaOH was mixed with a NaF solution (free of aluminate ions) having about 15 grams/kg. of F, are shown in Table VII and FIG. 3. In all cases solutions were at temperature before mixing. The solutions were mixed and stirred for an hour at temperature prior to filtering. The precipitates were carefully washed with ethanol, dried at 110° C., and weighed. The results show that increasing the temperature does not depress the yield of LiF greatly.

TABLE VII

*Effect of Temperature on the Precipitation of LiF With NaF Solution*

| | LiOH—NaOH Soln.,[a] g. | NaF Soln., g. | Temp. °C. | P.p.t. wt., g. | Analysis of precipitate | | | | Filtrate [d] | | K = (Li⁺)(F⁻), g.²/kg. |
| | | | | | Li | | Na, percent | F, percent | (Li), g./kg. | (F), g./kg. | |
| | | | | | Percent | Percent yield | | | | | |
|---|---|---|---|---|---|---|---|---|---|---|---|
| 7-A | 100.0 | [b] 180.0 | 24 | 0.9779 | 25.5 | 89.8 | 2.45 | 71.3 | 0.101 | 7.65 | 0.77 |
| 7-B | 50.0 | [c] 90.0 | 80 | 0.4769 | 25.3 | 87.1 | (e) | 64.8 | 0.129 | 8.15 | 1.05 |
| 7-C | 50.0 | [c] 90.0 | 90 | 0.4713 | 25.3 | 85.6 | (e) | 66.2 | 0.143 | 8.13 | 1.16 |

[a] 2.78 g./kg. Li in 2% NaOH.
[b] 15.77 g./kg. F.
[c] 16.11 g./kg. F.
[d] Calculated from initial liquors and analysis of the precipitate.
[e] Not determined.

The presence of $Al(OH)_4^-$ in solution has a marked effect on the precipitation of the LiF from LiOH—NaOH solution with NaF. The yield of LiF precipitate at 25° C. reaction temperature decreases in proportion to the amount of the aluminum present. At higher temperatures the presence of the aluminum has less effect and at 90° C. the effect has nearly vanished, i.e., the yield approaches that obtained with no aluminum present. This relationship is readily apparent in FIGURE 3 where the yield is plotted against temperature. The cycling spent liquor. The ion concentration product, $(Li^+)$ $(F^-)$, was fairly constant over the range of $F^-$ concentration, from 2.15 to 10.9 g./kg. Two experiments were made in which seed was present at a ratio of about 16:1 seed to expected product. The ion concentration product in these seeded experiments and in the 90 kg. batch reaction is lower than that obtained in other experiments, the value being about 1.36 instead of 1.74 g.$^2$/kg.$^2$. The results are tabulated and appear in Table VIII.

TABLE VIII

*Precipitation of LiF by Use of Cryolitic Liquor at 90° C.*

| | Cryolitic soln.,[a] g. | LiOH—NaOH soln.,[b] g. | Wt. ratio of solns. | Time of reaction, hrs. | P.p.t. wt., g. | Precipitate analyses | | | | Filtrate [c] | | $(Li^+)(F^-)$, g.$^2$/kg.$^2$ | Remarks |
|---|---|---|---|---|---|---|---|---|---|---|---|---|---|
| | | | | | | Li | | Al | F | | | | |
| | | | | | | percent | percent yield | percent | percent | $(Li^+)$, g./kg. | $(F^-)$, g./kg. | | |
| 8-A | 100.0 | 50.0 | 2.0 | 0.5 | 0.4331 | 24.1 | 75.2 | 2.78 | 61.7 | 0.229 | 8.22 | 1.88 | |
| 8-B | 100.0 | 50.0 | 2.0 | 1.0 | 0.4438 | 23.7 | 75.8 | 2.43 | 65.3 | 0.224 | 8.07 | 1.81 | |
| 8-C | 93.9 | 47.0 | 2.0 | 2.0 | 0.4046 | 23.5 | 72.9 | 2.65 | 65.2 | 0.251 | 8.12 | 2.04 | |
| 8-D | 100.0 | 50.0 | 2.0 | 4.0 | 0.4383 | 24.7 | 77.9 | 1.69 | 65.7 | 0.204 | 8.08 | 1.65 | |
| 8-E | 25.0 | 50.0 | 0.5 | 1.0 | 0.3317 | 24.5 | 58.6 | 1.80 | 64.6 | 0.767 | 2.15 | 1.65 | |
| 8-F | 50.0 | 50.0 | 1.0 | 1.0 | 0.4251 | 24.4 | 74.7 | 2.52 | 66.1 | 0.351 | 4.69 | 1.65 | |
| 8-G | 75.0 | 50.0 | 1.5 | 1.0 | 0.4487 | 24.2 | 78.2 | 1.81 | 65.9 | 0.242 | 6.63 | 1.60 | |
| 8-H | 87.5 | 50.0 | 1.75 | 1.0 | 0.4415 | 24.7 | 78.6 | 2.38 | 65.5 | 0.216 | 7.44 | 1.61 | |
| 8-J | 125.0 | 50.0 | 2.5 | 1.0 | 0.4299 | 24.5 | 75.9 | 2.13 | 64.3 | 0.191 | 9.14 | 1.75 | |
| 8-K | 160.0 | 40.0 | 4.0 | 1.0 | 0.3197 | 24.9 | 71.8 | 1.52 | 68.2 | 0.157 | 10.9 | 1.71 | |
| 8-L | [d] 104.2 | 52.1 | 2.0 | (e) | 0.4810 | 24.8 | 82.0 | | 66.0 | 0.218 | 7.97 | 1.74 | Slow addition of LiOH. |
| 8-M | [d] 243.0 | 123.0 | 1.98 | (f) | [g] 1.19 | 25.2 | 82.3 | 1.67 | 65.9 | [h] 0.175 | 7.68 | 1.34 | Seeded.[g] |
| 8-N | [d] 244.0 | 122.0 | 2.0 | (i) | [j] 1.21 | 24.7 | 82.3 | 1.75 | 66.0 | [h] 0.173 | 7.83 | 1.35 | Seeded.[j] |
| 8-P | [l][m] 60.0 | [m] 30.0 | 2.0 | (k) | ~290 | 24.3 | 82.3 | 1.80 | 66.4 | [h] 0.172 | [h] 8.07 | 1.39 | Large scale test. |

[a] Solution contains (in g./kg.): 15.0 F, 3.31 Al, 1.93 Na$_2$CO$_3$, and 17.9 NaOH, unless noted.
[b] Solution contains (in g./kg.): 2.78 Li and 20 NaOH.
[c] Calculated from initial liquors and precipitate analyses unless noted.
[d] Solution contains (in g./kg.): 15.0 F, 3.31 Al, 0.08 Li, 29.3 Na, and 1.0 CO$_2$.
[e] LiOH solution added over 10 min. period, mixture held another 50 min. before filtering.
[f] LiOH and cryolitic solutions added simultaneously over 30 min. period to the seed. Held for 30 min. more.
[g] Added 17.6 g. LiF seed obtained from a previous similar precipitation. Product weighed 18.79 g.
[h] By actual analysis of liquor.
[i] Added ½ cryolitic soln. and seed to flask, then added rest cryolitic soln. and LiOH soln. over 30 min. Held 15 min. more.
[j] Added 17.6 g. seed from Exp. 44A and obtained 18.81 g. product.
[k] Added LiOH soln. to cryolitic solution in 28 min. in stainless steel tank. Held for 32 min. more.
[l] Soln. contains (in g./kg.): 15.0 F, 3.49 Al, 0.08 Li, 26.2 Na, and 1.0 CO$_2$.
[m] Kg.

role of the $Al(OH)_4^-$ ion can be seen by analogy with the NaF—NaOH—H$_2$O and the Na$_3$AlF$_6$—NaOH—H$_2$O solubility systems. In these systems higher $F^-$ concentrations can be obtained at the same Na$^+$ concentration in the case of Na$_3$AlF$_6$. That is, the presence of the $Al(OH)_4^-$ ion in solutions has the effect of raising the value of the solubility product constant of NaF. The mechanism of this effect is not known but it is perhaps due to the lowering of the activities of the ions as a result of the presence of $Al(OH)_4^-$ ions. Thus, the $Al(OH)_4^-$ ions could also lower the activity of the Li$^+$ ions and result in an increase in the ion concentration product for LiF.

It should be noted that the above-mentioned discovered effect, i.e., achieving greater yields of LiF by increasing the temperature of precipitation (in aluminate ion-containing lithium hydroxide solutions) is contrary to what might be expected. Moreover, it is apparent from FIGURE 3 that at lower temperatures the yield of LiF under the prescribed conditions would be impractical and accordingly would render precipitation with recycle liquor undesirable. But, at higher temperatures, i.e., about 80–100° C., precipitation with recycle or cryolitic liquor is desirable and advantageous.

Therefore, where cryolite liquor or sodium fluoride solution containing aluminous material are used to precipitate LiF from LiOH solutions it is preferred to maintain the temperature at between 80–100° C. to increase the yield of lithium fluoride.

It has been found through experiments using a cryolitic liquor as the precipitating agent at 90° C. that a ratio of 2:1 (cryolitic liquor to LiOH—NaOH solution) was the optimum relationship without re-cycling spent liquor.

The continuous precipitation of LiF by mixing LiOH—NaOH and NaOH-cryolitic solutions in a single stage tank at 90° C. results in a reaction yield less than 50%. The observation of numerous batch precipitation experiments indicates that nucleation is very rapid and important. Seeding the reaction mixture is the best practical solution to the problem of obtaining the advantage of continuous precipitation while maintaining a high yield. Optimum ratios of seed to expected product can be readily determined for various systems. For one system, ratios of 16–20:1 (seed to expected product) have proven satisfactory.

The settling of the batch LiF product is quite rapid for the bulk of the material. The solids settle to about a 40% solids mass and have very high filtration rates.

The chemical and physical properties of the LiF product precipitated out of the LiOH—NaOH solution were examined. The LiF material after washing and drying was floury in appearance and showed no tendency to absorb water from the air. The powder does not compact readily without binder. The particle density was determined to be 2.65 g./cm.$^3$ and the calculated volume-surface mean diameter (harmonic mean diameter of the particles) is 21 microns.

As indicated previously, the recovery of the constituents of the pot lining used in electrolytic cells for the production of aluminum which have been exposed to fused salt electrolyte baths is important economically to achieve maximum efficiency. Where lithium compounds have been used in the fused salt electrolyte to increase efficiency in cell operation the recovery of as much of the lithium compound from the pot lining as possible is, of course, desirable. In addition to lithium constituent in the pot lining, cryolite is also present and its recovery is similarly highly desirable. The process which has been developed for the recovery of cryolite from spent pot linings involves the extraction of the pot lining with a caustic solution. When the spent pot lining is treated with an alkaline solution such as sodium hydroxide, as has already been discussed, both a cryolitic liquor and a black mud result. According to the instant invention the black mud is further treated with a mixture containing lime or lime and sodium hydroxide and the lithium is extracted as a hydroxide. Thereafter the lithium hydroxide is mixed with a fluoridic material, e.g., sodium fluoride or part of the cryolite liquor under certain conditions and a lithium fluoride precipitate results. The cryolitic liquor is treated with carbon dioxide in a normal cryolite recovery plant. As is readily apparent the two recovery systems lend themselves to combination very effectively.

In accordance with the preferred use of the invention in a combined process along with the recovery of cryolite from spent cell linings, investigations were made to determine the lithium disposition during treatment of the lining extract liquor.

After alkaline extraction of the cell lining, the cryolitic liquor resulting is subjected to carbonation. Bubbling $CO_2$ through the liquor results in a cryolite precipitate and a spent carbonate liquor. Some of the lithium constituent (approximately 10%) of the carbonaceous cell lining does not remain with the black mud but is removed with the cryolitic liquor. After carbonation of the cryolite liquor this lithium material will partially go out with the cryolite precipitate and partially remain in the spent carbonate liquor. When the recycled carbonate liquor is reacted (during synthesis in the "integrated cryolite recovery process") with $Na_2SiF_6$ to obtain NaF solution according to the following reaction:

$$2Na_2CO_3 + Na_2SiF_6 \rightarrow 6NaF + SiO_2 + 2CO_2$$

the lithium fraction in the liquor could co-precipitate with the silica and be lost. It has been found that if the $Li^+$ concentration in the carbonate liquor is no greater than 0.12 g. $Li^+$/1000 g. $H_2O$ the loss of lithium to the silica is minimized and is not as disproportionately large as when that $Li^+$ concentration is exceeded.

Two synthetic extract liquors were prepared from pure reagents corresponding to the types of liquors expected from operation of the recovery system either by itself or in conjunction with the production of synthetic cryolite from NaF and $NaAl(OH)_4$ solutions. Synthetic extracts were prepared by dissolving NaF in water. The $Al(OH)_3$ used was dissolved separately in 50% NaOH. These solutions were then blended and LiOH and $Na_2CO_3$ were then dissolved in the blended solution. The so-called "non-integrated" liquor (simulating liquor from the "non-integrated cryolite recovery process") and the "integrated" liquor (simulating liquor from the "integrated cryolite recovery process") were made in 500 gram batches. These solutions were carbonated at 60° C. until the final pH was 9.1. This required about 2.1 hours with a 12% $CO_2$ mixture with nitrogen (by volume). The mixture was then filtered and the solids were washed with about 5 grams of water. The part of the non-integrated liquor contained about 90.8% of the lithium input in the liquor and 4.6% of the lithium input in the solids. The product of the integrated liquor contained 91.8% of lithium input in the liquor and 4.9% of lithium input in the solids. The amount of lithium coprecipitated with the cryolite is roughly proportional to the concentration of lithium in the liquor.

If lithium-containing lining is treated for cryolite recovery, the liquors also will contain some lithium. The most practical effective means for reducing lithium loss during causticization of spent liquor is to reduce the lithium concentration in the latter. Lithium concentration in the spent liquor can be lowered by selection of the proper conditions for the caustic (alkaline) extraction of the pot lining.

The foregoing examples of the method of the present invention are intended for illustrative purposes only. It is apparent that various changes and modifications of the instant invention may be made without departing from the principles and spirit thereof.

It is particularly noted that the flexibility of the lithium recovery process render it useful in combination with any compatible operation, as for example, manufacture of calcium fluoride. For these reasons the scope of the present invention should not be limited by the foregoing disclosure but only by the appended claims wherein what is claimed is:

1. A method of recovering lithium in the form of a usable compound thereof from spent carbonaceous cell linings used in electrolytic cells which have been exposed to lithium-containing electrolytes comprising the steps of treating the carbonaceous cell linings with an alkaline material thereby producing a cryolitic liquor and a black mud containing lithium values, aluminous material, and fluorinous material, treating the black mud with a mixture containing lime to extract the lithium values as a lithium hydroxide-containing solution, reacting said lithium hydroxide-containing solution with a fluoridic material to precipitate lithium fluoride.

2. A method as in claim 1 wherein said mixture containing lime is a lime and sodium hydroxide mixture.

3. A method according to claim 2 wherein the fluoridic material for precipitating lithium fluoride is sodium fluoride-containing material.

4. A method according to claim 1 wherein the amount of lime used to treat the black mud is at least sufficient to react with substantially all the reactable fluorinous and aluminous material.

5. A method according to claim 1 wherein the lithium fluoride precipitation occurs in the presence of LiF seed.

6. A method according to claim 1 wherein said alkaline material is sodium hydroxide and the proportion of cell lining is adjusted to obtain a $F^-$ concentration in the resulting cryolitic liquor of about 9–15 g./kg.

7. A method according to claim 6 wherein the proportion of cell lining is adjusted to obtain a $F^-$ concentration in the resulting cryolitic liquor of 12–15 g./kg.

8. A method of recovering lithium in the form of a usable compound thereof from spent carbonaceous cell linings used in electrolytic reduction cells for the production of aluminum which have been exposed to lithium-containing electrolytes comprising the steps of treating said carbonaceous cell linings with an alkaline solution to produce a cryolitic liquor and a black mud containing lithium values, aluminous material and fluorinous material, treating the black mud with a mixture containing lime to obtain a lithium hydroxide-containing solution and black mud residue, filtering the lithium hydroxide-containing solution from the black mud residue, reslurrying the black mud residue with caustic solution thereby obtaining a reslurry liquor and a waste black mud residue product, returning the reslurry liquor to said filtration, reacting the lithium hydroxide-containing solution with a fluoridic material to precipitate lithium fluoride, and recovering the lithium fluoride formed.

9. A method according to claim 8 wherein the lithium fluoride precipitation occurs in the presence of seed particles.

10. A method of recovering lithium and cryolitic values from carbonaceous cell linings which have been exposed to lithium-containing electrolytes in electrolytic reduction cells for the production of aluminum comprising crushing the carbonaceous cell lining, treating the crushed cell lining material with an alkaline solution thereby producing cryolitic liquor containing cryolitic values and a black mud containing lithium values, aluminous material and fluorinous material, separating the cryolitic liquor from the black mud, carbonating the cryolitic liquor and recovering the cryolite formed, removing lithium values from the black mud as a lithium hydroxide-containing solution by treating the black mud with a mixture containing lime, separating the lithium hydroxide solution, and recovering the lithium values as lithium fluoride by reacting said lithium hydroxide-containing solution with a fluoridic material.

11. A method as in claim 10 wherein the sodium fluoride-containing material is cryolitic liquor.

12. A method as in claim 10 wherein the lithium fluoride precipitation occurs at a temperature of about 80–100° C.

13. A method of recovering lithium and cryolitic values from carbonaceous cell linings which have been exposed to lithium-containing electrolytes in electrolytic reduction cells for the production of aluminum comprising crushing the carbonaceous cell lining, treating the crushed cell lining material with an aqueous sodium hydroxide solution thereby obtaining as products a cryolitic liquor containing cryolitic values and a black mud containing lithium values, aluminous material and fluorinous material, holding the products for a suitable time to convert the major portion of the aluminous material to the hydrated form, separating the cryolitic liquor from the black mud, carbonating the cryolitic liquor and recovering cryolite, removing lithium values from the black mud as lithium hydroxide by treating the black mud with a mixture of sodium hydroxide and calcium hydroxide, separating the lithium hydroxide and recovering the lithium values as lithium fluoride by reacting the lithium hydroxide with sodium fluoride-containing material.

14. A method according to claim 13 wherein the amount of calcium hydroxide is at least sufficient to react with substantially all the reactable fluorinous and aluminous material.

15. A method of recovering lithium and cryolitic values from carbonaceous cell linings which have been exposed to lithium-containing electrolytes in electrolytic reduction cells for the production of aluminum comprising crushing the carbonaceous cell lining, treating the crushed cell lining material with sodium hydroxide solution thereby obtaining a cryolitic liquor containing cryolitic values and a black mud containing lithium values, aluminous material and fluorinous material, separating the cryolitic liquor from the black mud, reacting sodium carbonate and sodium silicofluoride in a silicofluoride reactor to obtain a sodium fluoride solution and a silica precipitate, removing the sodium fluoride solution and mixing it with the aforesaid cryolitic liquor, carbonating the sodium fluoride solution and cryolitic liquor mixture to produce cryolite and a carbonate liquor, recovering the cryolite and recycling the carbonate liquor to the silicofluoride reactor, removing lithium values from the black mud as a lithium hydroxide solution by treating the black mud with a mixture containing lime, separating the resulting lithium hydroxide-containing solution from the remaining black mud residue, and recovering the lithium values as lithium fluoride by reacting said lithium hydroxide-containing solution with a fluoridic material.

16. The method of claim 15 wherein the treating of crushed carbonaceous cell linings is performed with a 2% NaOH solution.

17. A method according to claim 15 wherein the amount of lime used to treat the black mud is more than sufficient to react with substantially all the reactable fluorinous and aluminous material.

18. A method according to claim 15 wherein the mixture containing lime is a lime and sodium hydroxide solution.

19. A method according to claim 15 wherein the mixture containing lime is a lime and sodium hydroxide slurry.

20. The method of claim 15 wherein the carbonaceous cell lining is crushed to a particle size of from 2 to 5 cm.

21. A method according to claim 15 wherein the fluoridic material for reaction with the lithium hydroxide solution is cryolitic liquor.

22. A method according to claim 15 wherein the fluoridic material for reaction with the lithium hydroxide solution is sodium fluoride from the silicofluoride reactor.

23. A method of recovering lithium and cryolitic values from carbonaceous cell linings which have been exposed to lithium-containing electrolytes in electrolytic reduction cells for the production of aluminum comprising crushing the carbonaceous cell lining, treating the crushed cell lining material with a sodium hydroxide solution thereby obtaining as products a cryolitic liquor containing cryolitic values and a black mud containing lithium values, said products containing aluminous material and fluorinous material, holding said products for a suitable time to connect the major portion of the aluminous material to the hydrated form, separating the cryolitic liquor from the black mud, reacting sodium carbonate and sodium silicofluoride in a silicofluoride reactor to obtain a sodium fluoride solution and a silica precipitate, removing the sodium fluoride solution and mixing it with the aforesaid cryolitic liquor, carbonating the sodium fluoride solution and cryolite liquor mixture to produce cryolite and a carbonate liquor, recovering the cryolite and recycling the carbonate liquor to the silicofluoride reactor, removing lithium values from the black mud as a lithium hydroxide solution by treating the black mud with a mixture of sodium hydroxide and calcium hydroxide wherein the amount of calcium hydroxide is about 0.30–0.37 gram per gram of black mud, separating the resulting lithium hydroxide-containing solution from the remaining black mud residue, and recovering the lithium values as lithium fluoride by reacting said lithium hydroxide-containing solution with sodium fluoride-containing material.

24. A method of recovering lithium and cryolitic values from carbonaceous cell linings which have been exposed to lithium-containing electrolytes in electrolytic reduction cells for the production of aluminum comprising crushing the carbonaceous cell lining to a particle size of up to 5 cm, treating the crushed cell lining material with a sodium hydroxide solution thereby obtaining as products a cryolitic liquor containing cryolitic values and a black mud containing lithium values, said products containing aluminous material and fluorinous material, holding said products for a suitable time to convert the major portion of the aluminous material to the hydrated form, separating the cryolitic liquor from the black mud, reacting sodium carbonate and sodium silicofluoride in a silicofluoride reactor to obtain a sodium fluoride solution and a silica precipitate, removing the sodium fluoride solution and mixing it with the aforesaid cryolitic liquor, carbonating the sodium fluoride solution and cryolitic liquor mixture to produce cryolite and a carbonate liquor, recovering the cryolite and recycling the carbonate liquor to the silicofluoride reactor, removing lithium values from the black mud as a lithium hydroxide-containing solution by treating the black mud with a mixture containing lime, filtering the lithium hydroxide-containing solution from the remaining black mud residue, reslurrying the black mud residue with caustic thereby obtaining a reslurry liquor and a waste black mud residue product, recycling the reslurry liquor to said filtration, and recovering the lithium values as lithium fluoride by reacting the lithium hydroxide-containing solution with a fluoridic material.

25. A method of recovering lithium and cryolitic values from carbonaceous cell linings which have been exposed to lithium-containing electrolytes in electrolytic reduction cells for the production of aluminum comprising crushing the carbonaceous cell lining, extracting the crushed cell lining material by forming a slurry of cell lining and sodium hydroxide solution thereby obtaining as extraction products a cryolitic liquor containing cryolitic values and a black mud containing lithium values, said products containing aluminous and fluorinous material, separating the cryolitic liquor from the black mud, reacting sodium carbonate and sodium silicofluoride in a silicofluoride reactor to obtain a sodium fluoride solution and a silica precipitate, removing the sodium fluoride solution and mixing it with the aforesaid cryolitic liquor, carbonating the sodium fluoride solution and cryolite liquor mixture to produce cryolite and a carbonate liquor, recovering the cryolite and recycling a portion of the carbonate liquor to the silicofluoride reactor, causticizing the remainder of the carbonate liquor by adding lime thereto, recycling the causticized liquor to cell lining extraction, removing lithium values from the black mud as a lithium hydroxide solution by treating the black mud with a mixture containing lime, filtering the resulting lithium hydroxide containing solution from the remaining black mud residue, reslurrying the black mud residue with sodium hydroxide solution thereby obtaining a reslurry liquor and a waste black mud residue product, recycling the reslurry liquor to said filtration and recovering lithium values as lithium fluoride by reacting said lithium hydroxide-containing solution with a fluoridic material.

References Cited in the file of this patent

UNITED STATES PATENTS

| | | |
|---|---|---|
| 1,382,165 | Bishop | June 21, 1921 |
| 1,544,114 | Weedman | June 30, 1925 |
| 2,714,053 | Albert | July 26, 1955 |
| 2,858,198 | McGeer | Oct. 28, 1958 |
| 2,939,824 | Greenfield | June 7, 1960 |
| 3,065,051 | Mader | Nov. 20, 1962 |

UNITED STATES PATENT OFFICE
CERTIFICATE OF CORRECTION

Patent No. 3,151,934 October 6, 1964

William R. King

It is hereby certified that error appears in the above numbered patent requiring correction and that the said Letters Patent should read as corrected below.

Column 1, line 51, strike out "then", first occurrence; column 3, line 61, for "conjunctions" read -- conjunction --; column 4, TABLE I, second column, line 1 thereof, for ".664" read -- 0.664 --; column 7, line 55, for "hours" read -- hour --; columns 13 and 14, TABLE VI, sixth column, line 23 thereof, for "$e_{39.9}$" read -- $e_{37.9}$ --; column 13, line 65, for "liquir" read -- liquor --.

Signed and sealed this 27th day of July 1965.

(SEAL)
Attest:

ERNEST W. SWIDER
Attesting Officer

EDWARD J. BRENNER
Commissioner of Patents